United States Patent
Kato et al.

(10) Patent No.: US 8,744,170 B2
(45) Date of Patent: Jun. 3, 2014

(54) IMAGE PROCESSING APPARATUS DETECTING QUADRILATERAL REGION FROM PICKED-UP IMAGE

(75) Inventors: Hiroyuki Kato, Fussa (JP); Jun Muraki, Hamura (JP); Hiroshi Shimizu, Tachikawa (JP); Hiroyuki Hoshino, Ome (JP); Erina Ichikawa, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 27 days.

(21) Appl. No.: 13/563,908

(22) Filed: Aug. 1, 2012

(65) Prior Publication Data
US 2013/0033618 A1  Feb. 7, 2013

(30) Foreign Application Priority Data
Aug. 4, 2011  (JP) ................. 2011-170616

(51) Int. Cl.
 *G06K 9/00* (2006.01)
 *G06K 9/40* (2006.01)
 *H04N 5/235* (2006.01)
(52) U.S. Cl.
 USPC .......................... 382/154; 382/274; 348/222.1
(58) Field of Classification Search
 USPC ................. 382/154, 190, 195, 254, 266, 274;
  348/222.1, E05.062, E05.031
 See application file for complete search history.

(56) References Cited

U.S. PATENT DOCUMENTS

| | | | |
|---|---|---|---|
| 6,900,834 B2 * | 5/2005 | Henderson et al. ........ 348/226.1 |
| 7,480,003 B2 * | 1/2009 | Okawara ...................... 348/349 |
| 7,606,439 B2 * | 10/2009 | Lefebure et al. ............... 382/274 |
| 2004/0234124 A1 * | 11/2004 | Nakai et al. ................... 382/154 |
| 2004/0264763 A1 * | 12/2004 | Mas et al. ...................... 382/154 |
| 2005/0196034 A1 * | 9/2005 | Hattori et al. ................. 382/154 |
| 2009/0040312 A1 | 2/2009 | Hattori |
| 2009/0225180 A1 * | 9/2009 | Maruyama et al. ........ 348/222.1 |
| 2009/0278958 A1 * | 11/2009 | Bregman-Amitai et al. ........................ 348/231.99 |
| 2011/0234840 A1 * | 9/2011 | Klefenz et al. ............. 348/222.1 |

FOREIGN PATENT DOCUMENTS

| | | |
|---|---|---|
| JP | 2001-268602 A | 9/2001 |
| JP | 2002-305671 A | 10/2002 |
| JP | 2005-267457 A | 9/2005 |

(Continued)

OTHER PUBLICATIONS

Japanese Office Action dated May 21, 2013 (and English translation thereof) in counterpart Japanese Application No. 2011-170616.

*Primary Examiner* — Andrae S Allison
(74) *Attorney, Agent, or Firm* — Holtz Holtz Goodman & Chick PC

(57) ABSTRACT

An image processing apparatus includes an obtaining section, a detection section, a first identification section and a second identification section. The obtaining section obtains image data of a first picked-up image and a second picked-up image picked up by an image pickup section. The detection section detects a brightness change region where brightness changes at predetermined time intervals in the first picked-up image on the basis of the obtained image data of the first picked-up image. The first identification section performs straight line detection processing on the obtained image data of the second picked-up image to detect a straight line, so as to identify a candidate straight line in a corresponding region corresponding to the brightness change region. The second identification section identifies a quadrilateral region including the candidate straight line as an extraction candidate region in the second picked-up image.

10 Claims, 6 Drawing Sheets

(56) References Cited

FOREIGN PATENT DOCUMENTS

| | | |
|---|---|---|
| JP | 2007-058634 A | 3/2007 |
| JP | 2007-266694 A | 10/2007 |
| JP | 2009-042162 A | 2/2009 |
| JP | 2009-230193 A | 10/2009 |
| JP | 2011-097251 A | 5/2011 |

* cited by examiner

IMAGE PROCESSING APPARATUS DETECTING QUADRILATERAL REGION FROM PICKED-UP IMAGE

BACKGROUND OF THE INVENTION

1. Field of the Invention

The present invention relates to an image processing apparatus and an image processing method which detect a quadrilateral region from a picked-up image.

2. Description of the Related Art

Conventionally, there is known an image pickup apparatus, for example, disclosed by Japanese Patent Application Laid-Open Publication No. 2005-267457, the image pickup apparatus having a function to pick up images of documents, such as paper documents and name cards, letters and figures written on a whiteboard, and a display screen displayed on a liquid crystal display, so as to store image data thereof. More specifically, the image pickup apparatus performs quadrilateral detection processing on image data of a picked-up image so as to detect a quadrilateral region, extracts an image of the quadrilateral region, and performs trapezoid correction processing on the extracted image so as to transform the image into a rectangular image.

BRIEF SUMMARY OF THE INVENTION

According to a first aspect of the present invention, there is provided an image processing apparatus including: an obtaining section which obtains image data of a first picked-up image and a second picked-up image picked up by an image pickup section; a detection section which detects a brightness change region where brightness changes at predetermined time intervals in the first picked-up image on the basis of the obtained image data of the first picked-up image; a first identification section which performs straight line detection processing on the obtained image data of the second picked-up image to detect a straight line, so as to identify a candidate straight line in a corresponding region corresponding to the brightness change region; and a second identification section which identifies a quadrilateral region including the candidate straight line as an extraction candidate region in the second picked-up image.

According to a second aspect of the present invention, there is provided an image processing method including: obtaining image data of a first picked-up image and a second picked-up image picked up by an image pickup section; detecting a brightness change region where brightness changes at predetermined time intervals in the first picked-up image on the basis of the obtained image data of the first picked-up image; performing straight line detection processing on the obtained image data of the second picked-up image to detect a straight line, so as to identify a candidate straight line in a corresponding region corresponding to the brightness change region; and identifying a quadrilateral region including the candidate straight line as an extraction candidate region in the second picked-up image.

According to a third aspect of the present invention, there is provided a recording medium recording a program which makes a computer of an image processing apparatus function as: an obtaining section which obtains image data of a first picked-up image and a second picked-up image picked up by an image pickup section; a detection section which detects a brightness change region where brightness changes at predetermined time intervals in the first picked-up image on the basis of the obtained image data of the first picked-up image; a first identification section which performs straight line detection processing on the obtained image data of the second picked-up image to detect a straight line, so as to identify a candidate straight line in a corresponding region corresponding to the brightness change region; and a second identification section which identifies a quadrilateral region including the candidate straight line as an extraction candidate region in the second picked-up image.

DETAILED DESCRIPTION OF THE INVENTION

In the following, an embodiment of the present invention is described referring to the accompanying drawings. However, the present invention is not limited thereto.

An image pickup apparatus 100 in accordance with an embodiment of the present invention detects a brightness change region A in picked-up images, which are picked up by an image pickup section 1, on the basis of image data of the picked-up images. The brightness change region A is a region where brightness changes at predetermined time intervals. The image pickup apparatus 100 performs straight line detection processing to detect straight lines L on image data of a picked-up image, so as to identify straight lines L (candidate straight lines L1) included in a corresponding region B which corresponds to the brightness change region A, and identify a quadrilateral region constituted of the identified straight lines L as an extraction candidate region C in the picked-up image.

Figure 1:
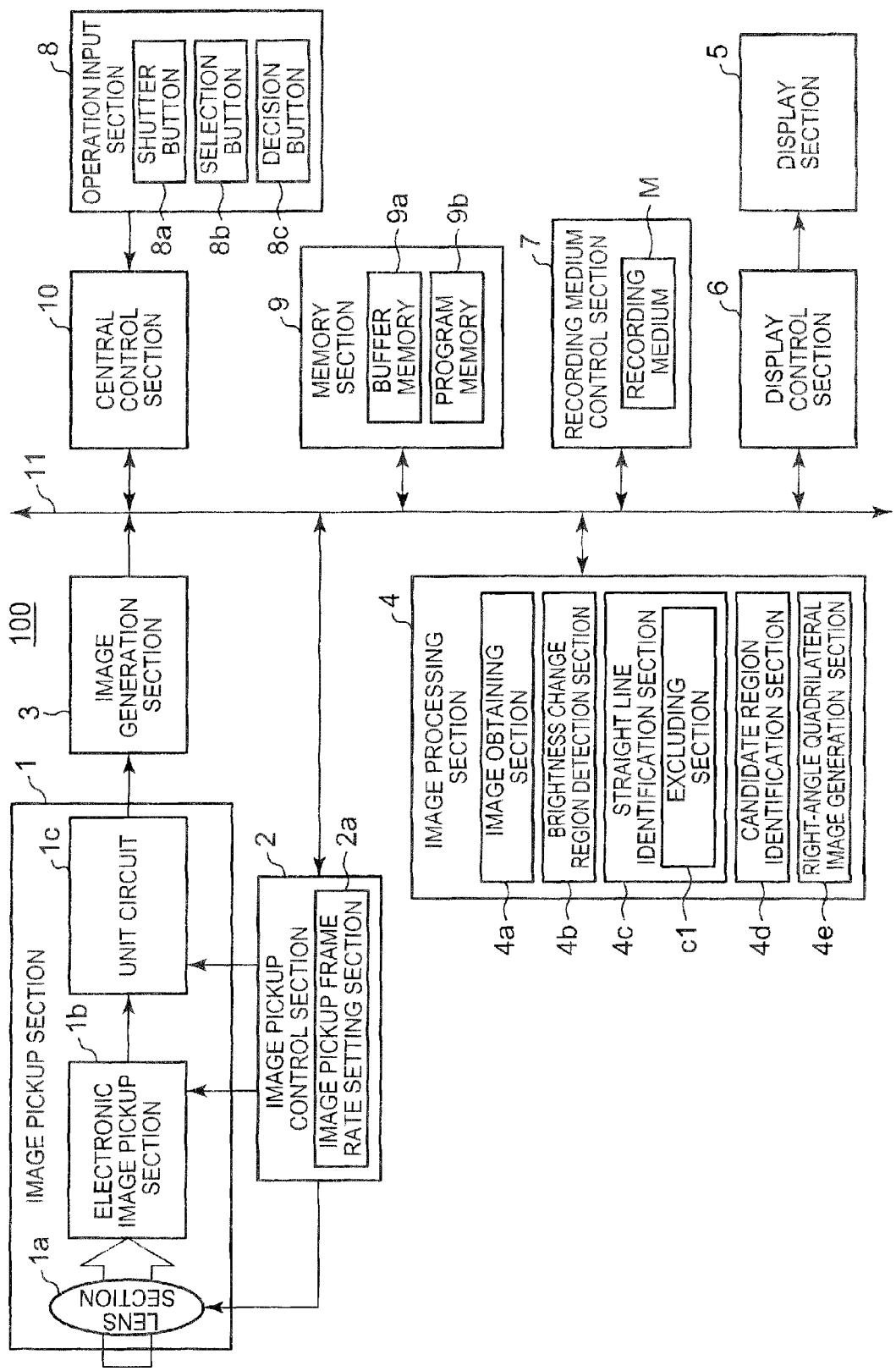
FIG. 1 is a block diagram schematically showing a configuration of an image pickup apparatus in accordance with an embodiment of the present invention.

FIG. 1 is a block diagram schematically showing a configuration of the image pickup apparatus 100 in accordance with the embodiment.

As shown in FIG. 1, the image pickup apparatus 1 includes the image pickup section 1, an image pickup control section 2, an image generation section 3, an image processing section 4, a display section 5, a display control section 6, a recording medium control section 7, an operation input section 8, a memory section 9, and a central control section 10.

The image pickup control section 2, the image generation section 3, the image processing section 4, the display control section 6, the recording medium control section 7, the memory section 9, and the central control section 10 are connected via a bus line 11.

The image pickup section 1 constitutes an image pickup section which picks up images of a subject. More specifically, the image pickup section 1 picks up images of a display screen 201 of a display apparatus 200 (shown in FIG. 5A) as a subject.

The display apparatus 200 is described.

As the display apparatus 200, a well-known apparatus which displays display contents while rewriting the display contents at predetermined time intervals can be used. More specifically, the display apparatus 200 includes the display screen 201 constituted of a CRT (Cathode Ray Tube), a liquid crystal display panel, an organic EL display panel, or the like (all not shown). The display apparatus 200 generates video signals representing various pieces of information which can be visually recognized by a user, such as letters, numeral values and operation states, and displays images of the pieces of information while rewriting the images at a predetermined frame rate corresponding to a refresh rate (70 Hz/sec., for example). That is, while rewriting the images of the pieces of information a predetermined number of times per unit time (70 times/sec., for example) in accordance with the refresh rate, the display apparatus 200 outputs the images from the display screen 201.

Thus, the display apparatus 200 constitutes an output apparatus which outputs images at predetermined rewriting intervals.

In the embodiment, the display screen 201 of the display apparatus 200 is shown as a subject. However, this is just an example. As long as images are outputted from an output apparatus at predetermined rewriting intervals, the subject is not thereto. That is, for example, projected images displayed on a screen, a wall or the like by a projector (not shown) in such a way as to be rewritten at predetermined intervals, may be used as a subject.

The image pickup section 1 includes a lens section 1a, an electronic image pickup section 1b and a unit circuit 1c.

The lens section 1a includes a zoom lens, a focus lens and a diaphragm (all not shown), and forms optical images of a subject, the optical images which pass through the lenses.

The electronic image pickup section 1b is constituted of an image sensor such as a CCD (Charge Coupled Device) or a CMOS (Complementary Metal-Oxide Semiconductor). The electronic image pickup section 1b converts the optical images, which pass through the lenses of the lens section 1a, into two-dimensional image signals (RGB image data) at predetermined image pickup intervals for an image pickup frame rate, and outputs the image signals to the unit circuit 1c.

The unit circuit 1c includes a CDS (Correlated Double Sampling) circuit, an AGC (Auto Gain Control), and an ADC (Analog to Digital Converter) (all not shown). The unit circuit 1c holds analog image signals with the CDS, the analog image signals corresponding to the optical images of the subject outputted from the electronic image pickup section 1b and inputted into the unit circuit 1c, amplifies the image signals with the AGC, and then converts the amplified image signals into digital image signals with the ADC. Then, the unit circuit 1c sends the digital image signals to the image generation section 3.

The image pickup control section 2 controls operations of the lens section 1a, the electronic image pickup section 1b, the unit circuit 1c and the like of the image pickup section 1.

That is, the image pickup control section 2 includes a driving source, such as a motor, and a driver which drives the driving source (both not shown), and drives the zoom lens and the focus lens of the lens section 1a in an optical axis direction. The image pickup control section 2 includes a diaphragm driving section (not shown) which expands/reduces the diameter of the diaphragm of the lens section 1a, so as to expand/reduce the diameter thereof in accordance with an exposure adjustment condition.

The image pickup control section 2 includes an image pickup frame rate setting section 2a, a not-shown TG (Timing Generator), and a not-shown driver which drives the electronic image pickup section 1b. The image pickup control section 2 controls operation timing of the electronic image pickup section 1b and operation timing of the unit circuit 1c via the TG and the driver in accordance with an image pickup frame rate and/or image pickup conditions (exposure time, for example).

The image pickup frame rate setting section 2a sets the image pickup frame rate which is related to driving cycles (intervals) of the electronic image pickup section 1b and the unit circuit 1c to a predetermined value.

More specifically, in brightness change region detection processing in image pickup processing (described below), the image pickup frame rate setting section 2a sets the image pickup frame rate to not a value (15 fps, for example) which corresponds to normal speed photography but a value (120 fps, for example) which corresponds to high speed photography. With the high speed photography, the number of frame images F (i.e. first images, shown in FIG. 5A, for example) picked up per unit time is more than that with the normal speed photography. At the time, the image pickup frame rate setting section 2a may switch the image pickup frame rate from the value corresponding to the normal speed photography to the value corresponding to the high speed photography, or may change the image pickup frame rate from the value corresponding to the normal speed photography to the value corresponding to the high speed photography continuously or stepwise, so as to set the image pickup frame rate to the value corresponding to the high speed photography.

If a refresh rate (40 Hz, for example) of an output apparatus, such as the display apparatus 200, which is a subject, is known by a user, the image pickup frame rate setting section 2a may set the image pickup frame rate to a value (40 fps, for example) corresponding to the refresh rate thereof on the basis of a predetermined operation by the user onto the operation input section 8.

On the basis of the image pickup frame rate set by the image pickup frame rate setting section 2a, and/or various image pickup conditions (exposure time, for example), the image pickup control section 2 operates the electronic image pickup section 1b at predetermined timing so as to convert the optical images of the subject, the optical images which pass through the lens section 1a, into analog image signals. In addition, the image pickup control section 2 operates the unit circuit 1c at predetermined timing so as to convert the analog image signals of the frame images F, the analog image signals which are outputted from the electronic image pickup section 1b and inputted into the unit circuit 1c, into digital image signals.

That is, the image pickup control section 2 controls the electronic image pickup section 1b and the unit circuit 1c of the image pickup section 1 so that the frame images F are picked up at predetermined image pickup intervals corresponding to the image pickup frame rate.

The image generation section 3 generates brightness signals Y and color difference signals Cb and Cr (YUV data), which are digital values, from the digital image signals sent from the unit circuit 1c.

More specifically, the image generation section 3 performs color processing including pixel interpolation and γ correction with a color processing circuit (not shown) on the distal image data of the frame images F sent from the unit circuit 1c at predetermined time intervals, and then generates the brightness signals Y and the color difference signals Cb and Cr (YUV data), which are digital values, successively.

Then, the image generation section 3 outputs image data of the generated brightness signals and color difference signals to the image processing section 4.

The image processing section 4 includes an encoding section and a decoding section (both not shown). The encoding section compresses and encodes the image data (YUV data) of the frame images F generated by the image generation section 3 with a predetermined encoding method (the Motion-JPEG, the JPEG, or the like). The decoding section decodes the encoded image data read from the recording medium control section 7 with a decoding method which corresponds to the encoding method.

The image processing section 4 includes an image obtaining section 4a, a brightness change region detection section 4b, a straight line identification section 4c, a candidate region identification section 4d, and a right-angle quadrilateral image generation section 4e.

The image obtaining section 4a obtains image data of picked-up images picked up by the image pickup section 1.

That is, the image obtaining section 4a successively obtains image data of the frame images F, which are picked up by the image pickup section 1 at predetermined image pickup intervals. More specifically, the image pickup section 1 picks up images of, as a subject, the display screen 201 of the display apparatus 200, namely, the display screen 201 on which various pieces of information are displayed at their respective predetermined positions (nearly the whole region of the display screen 201, for example) at predetermined image pickup intervals, whereby the image generation section 3 generates and outputs YUV data of the plurality of frame images F successively, and the image obtaining section 4a obtains the YUV data thereof successively.

In the embodiment, as the image data of the picked-up images (frame images F) obtained by the image obtaining section 4a, the image data of the picked-up images picked up by the image pickup section 1 at predetermined image pickup intervals are described. However, this is not a limit but an example. That is, as long as the brightness change region detection section 4b described below can detect a brightness change region, where brightness changes at predetermined time intervals, in picked-up images, the image data may be image data of picked-up images picked up by the image pickup section 1 at predetermined timing, for example.

In this case, the image obtaining section 4a may obtain image data of a predetermined number of picked-up images picked up intermittently at predetermined timing, or may obtain image data of one picked-up image picked up at predetermined timing, in such a way as to correspond to the image pickup timing of the image pickup section 1.

Thus, the image obtaining section 4a constitutes an obtaining section which obtains image data of picked-up images picked up by the image pickup section 1.

The image obtaining section 4a obtains image data of a picked-up image (an image for recording, i.e. a recording image G or a second image) picked up by the image pickup section 1 on the basis of a full-press operation by a user onto a shutter button 8a of the operation input section 8.

Figure 5A:
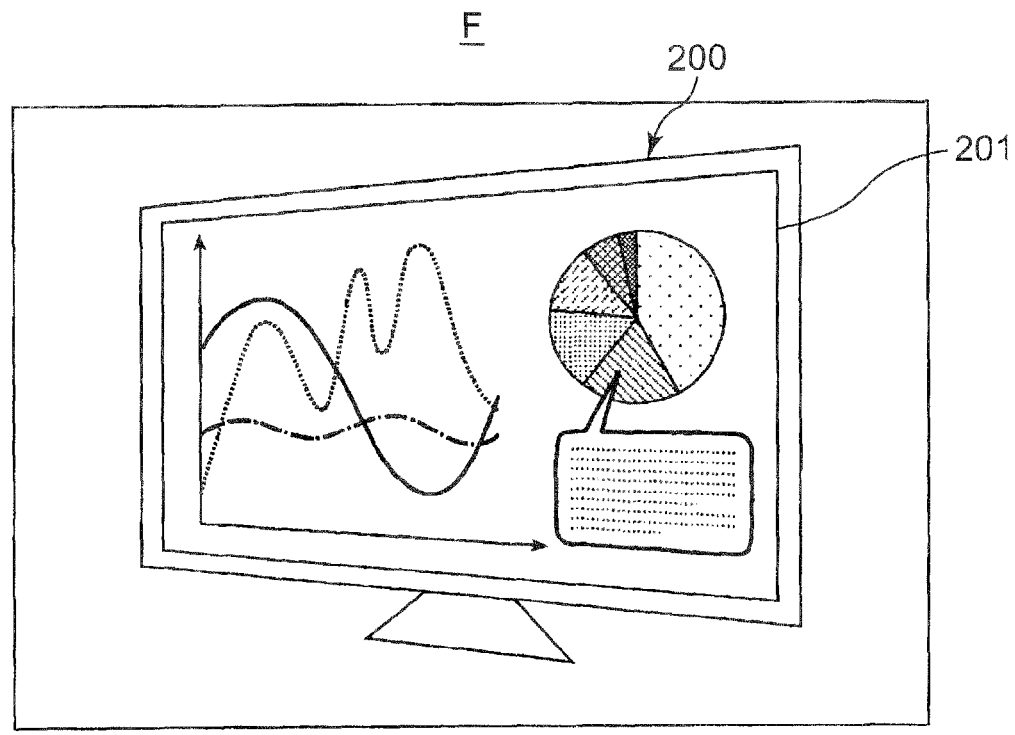
FIGS. 5A and 5B schematically show examples of images in the image pickup processing shown in FIG. 2.
Figure 5B:
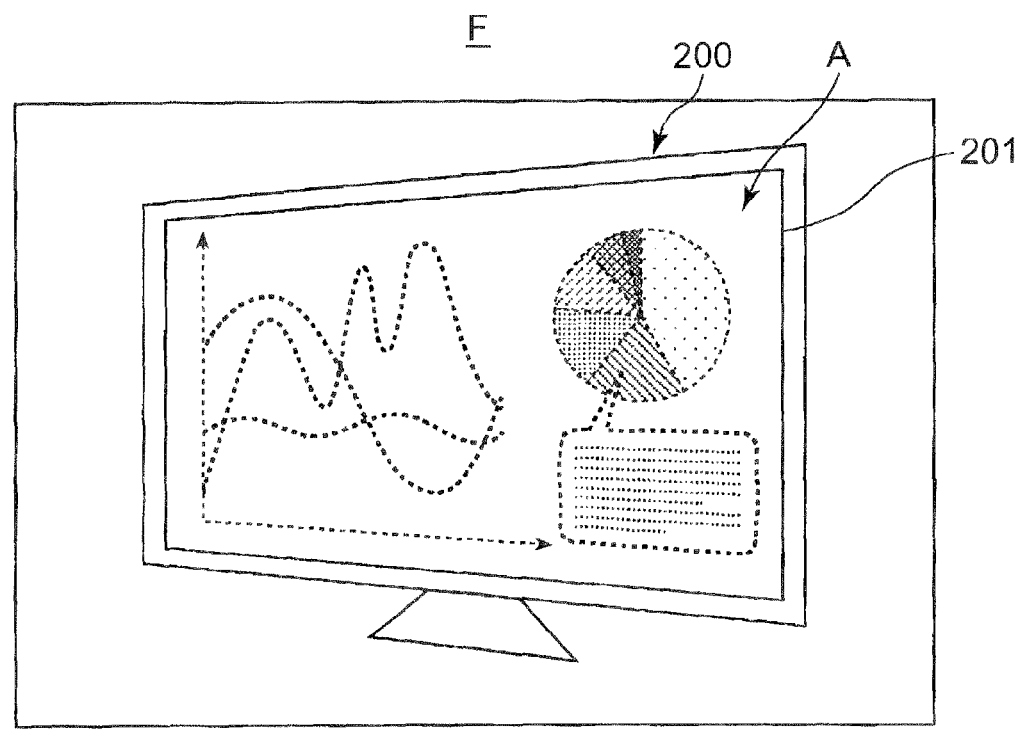

More specifically, the image obtaining section 4a obtains image data (YUV data) of a predetermined number (one, for example) of recording images G, which are picked up by the image pickup section 1, and the image data of which are generated by the image generation section 3, on the basis of a full-press operation by a user onto the shutter button 8a, in such a way as to have a similar composition to the compositions of the frame images F, which are picked up at predetermined image pickup intervals, and used by the brightness change region detection section 4b to detect the brightness change region A (shown in FIG. 5B and described below).

The brightness change region detection section 4b detects the brightness change region A in the frame images F, the brightness change region A where brightness changes at predetermined time intervals.

That is, in the images of various pieces of information displayed on the display screen 201 of the display apparatus 200 at predetermined rewriting intervals, the brightness of each pixel changes periodically. In particular, in the display apparatus 200 having a relatively low refresh rate, chronic change of brightness in each pixel of displayed images appears as fine flicker.

In the case where images (shown in FIG. 5A) displayed at predetermined rewriting intervals on the display screen 201 of the display apparatus 200 are picked up as a subject, the brightness change region detection section 4b detects the brightness change region A where brightness changes at predetermined time intervals in the frame images F on the basis of the image data of the frame images F successively obtained by the image obtaining section 4a. More specifically, the brightness change region detection section 4b makes pairs from the plurality of frame images F, which are picked up at the image pickup frame rate (120 fps, for example) corresponding to the high speed photography. A pair is constituted of a first frame image F and a second frame image F picked up right after the first frame image F. The brightness change region detection section 4b calculates, with respect to each pair, a difference between brightness components (brightness signals Y, for example) included in the image data of the first and second frame images F, and identifies a brightness change amount of change of brightness from the first frame image F to the second frame image F on a pixel basis. Then, the brightness change region detection section 4b identifies all pixels where brightness changes periodically on the basis of the brightness change amounts of the pixels identified with respect to all the frame images F, so as to identify a region constituted of the pixels where brightness changes periodically as the brightness change region A (shown in FIG. 5B). FIG. 5B schematically shows a state in which brightness changes in the pixels of the brightness change region A, using broken lines.

Furthermore, the brightness change region detection section 4b obtains information on the position of the brightness change region A in the frame images F (coordinates of all the pixels of the brightness change region A, for example), and temporarily stores the information in a predetermined storage section (a buffer memory 9a or the like).

The above-described detection method of the brightness change region A is not a limit but an example. Hence, a publically-known detection method may be used therefor.

In the case where images are picked up under a light source (a fluorescent light), the light amount of which changes in accordance with a power supply frequency (50 Hz or 60 Hz, for example), the brightness change region detection section 4b may exclude time intervals corresponding to the power supply frequency, and identify the time intervals at which brightness changes in each pixel to detect the brightness change region A. When the refresh rate of the display apparatus 200 agrees with the power supply frequency, the brightness change occurs in all the pixels of the frame images F. Hence, the brightness change region detection section 4b may determine that it is due to the influence from the light source when brightness change occurs in all the pixels of the frame images F, and may determine that it is not due to the influence from the light source when brightness change occurs in pixels of a portion of the frame images F (the display screen 201 of the display apparatus 200, for example).

In the embodiment, as a detection method of the brightness change region A in a picked-up image/images by the brightness change region detection section 4b, the detection method based on the image data of the plurality of picked-up images, which are successively obtained by the image obtaining section 4a, is described. However, this is not a limit but an example. Hence, for example, the brightness change region A may be detected on the basis of image data of one picked-up image obtained by the image obtaining section 4a.

That is, for example, in a case where the electronic image pickup section 1b is constituted of a CMOS image sensor, timing to read charge signals, namely, timing to start accumulating charges, differs in accordance with the position of a pixel. Hence, it is possible that the brightness change region detection section 4b calculates, on the basis of image data of one frame image F obtained by the image obtaining section 4a, a difference between brightness components (brightness signals Y, for example) corresponding to pixels which are next to each other at a predetermined point in an image pickup region of the CMOS image sensor, or a difference between brightness components corresponding to regions set by dividing the image pickup region in a predetermined direction (the vertical direction, for example), and detects the brightness change region A in the frame image F on the basis of the difference between the brightness components.

Furthermore, for example, in a case where the electronic image pickup section 1b is constituted of a CCD image sensor, it is possible that the image pickup control section 2 reads charges of one frame image F from the CCD image sensor with respect to each region (for example, each line of an image pickup region, the line in which a plurality of pixels is arranged in a predetermined direction) with time difference, and the brightness change region detection section 4b calculates a difference between brightness components corresponding to the regions, and detects the brightness change region A in the frame image F on the basis of the difference between the brightness components.

In the embodiment, the brightness change region detection section 4b constitutes a detection section which detects the brightness change region A where brightness changes at predetermined time intervals in a picked-up image (or picked-up images) on the basis of image data of the picked-up image obtained by the image obtaining section 4a.

The straight line identification section 4c identifies straight lines L (candidate straight lines L1) included in the corresponding region B, which corresponds to the brightness change region A, in the recording image G.

The straight line identification section 4c includes an excluding section c1 which excludes, from among all the straight lines L included in the recording image G obtained by the image obtaining section 4a, straight lines (non-candidate straight line) L2 detected outside the corresponding region B.

More specifically, the straight line identification section 4c performs straight line detection processing on the whole image region of the recording image G to detect all the straight lines L included in the recording image G. For example, the straight line identification section 4c obtains brightness components (brightness signals Y, for example) included in the image data of the recording image G obtained by the image obtaining section 4a, and performs the straight line detection processing (Hough transform, for example) on the brightness components, so as to detect all the straight lines L in the recording image G.

Figure 6A:
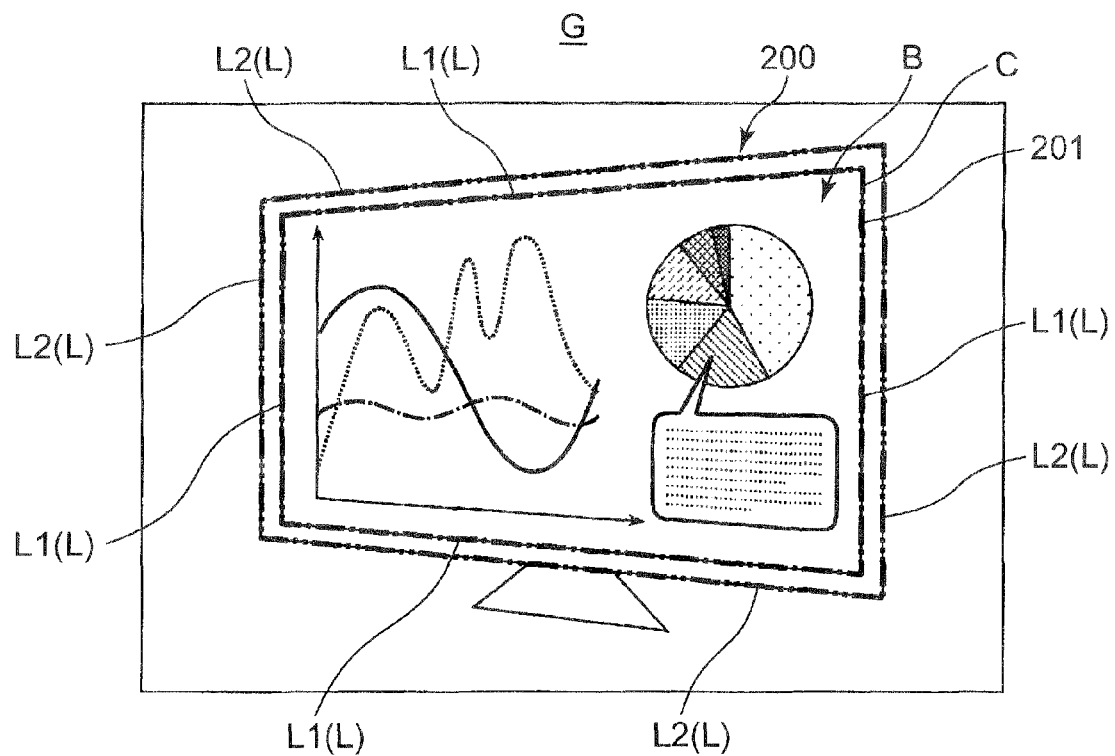
FIGS. 6A and 6B schematically show examples of images in the image pickup processing shown in FIG. 2.

Then, the straight line identification section 4c obtains the information on the position of the brightness change region A from the storage section (the buffer memory 9a or the like), so as to identify the position of the corresponding region B, which corresponds to the brightness change region A, in the recording image G, which has a similar composition to the compositions of the frame images F, which are used to detect the brightness change region A by the brightness change region detection section 4b. Then, the excluding section c1 identifies, from among all the straight lines L included in the recording image G, the straight lines L2 detected outside the corresponding region B, which corresponds to the brightness change region A. After that, the excluding section c1 excludes the straight lines L2 (schematically shown by two-dot chain lines in FIG. 6A), which are detected outside the corresponding region B, from all the straight lines L. Consequently, the straight line identification section 4c identifies the candidate straight lines L1 (schematically shown by one-dot chain lines in FIG. 6A) included in the corresponding region B, which corresponds to the brightness change region A, in the recording image G of the display screen 201 of the display apparatus 200.

As the straight line detection processing, the Hough transform is described. However, this is not a limit but an example. Hence, instead of the Hough transform, edge detection or the like may be used as the straight line detection processing. The Hough transform and the edge detection are publically-known technologies. Therefore, the detailed description thereof is omitted.

Thus, the straight line identification section 4c constitutes a first identification section which performs the straight line detection processing on the image data of the picked-up image obtained by the image obtaining section 4a to detect the straight lines L, so as to identify the straight lines L (candidate straight lines L1) included in the corresponding region B, which corresponds to the brightness change region A.

The candidate region identification section 4d identifies the extraction candidate region C which is a candidate for an image (region) to be extracted from the recording image G.

That is, the candidate region identification section 4d identifies quadrilateral regions, each of which is constituted of the candidate straight lines L1 identified (or the straight lines L detected) by the straight line identification section 4c, as the extraction candidate region C in the recording image G. More specifically, the candidate region identification section 4d identifies the extraction candidate region C from among a plurality of quadrilateral regions conspicuously displayed on the display section 5. For example, the candidate region identification section 4d identifies quadrilateral regions, each of which is formed by four candidate straight lines L1 extending in predetermined directions among all the candidate straight lines L1 identified by the straight line identification section 4c. (See FIG. 6A.) Then, the candidate region identification section 4d identifies, from among all the identified quadrilateral regions, a quadrilateral region specified on the basis of a predetermined operation on a selection button 8b, a decision button 8c or the like of the operation input section 8 by a user as the extraction candidate region C.

Thus, the candidate region identification section 4d constitutes a second identification section which identifies a quadrilateral region constituted of the candidate straight lines L1 identified (or the straight lines L detected) by the straight line identification section 4c as the extraction candidate region C in the picked-up image.

The right-angle quadrilateral image generation section 4e generates a right-angle quadrilateral image R (shown in FIG. 6B) of a quadrilateral region.

That is, the right-angle quadrilateral region generation section 4e performs right-angle quadrilateral transformation processing on an image of the quadrilateral region identified by the candidate region identification section 4d as the extraction candidate region C, so as to generate the right-angle quadrilateral image R. More specifically, the right-angle quadrilateral image generation section 4e extracts an image region in the extraction candidate region C (quadrilateral region) from the recording image G, and then performs the right-angle quadrilateral transformation processing (trapezoid correction, for example) on the image data of the extracted image region, so as to generate the right-angle quadrilateral image R (a rectangular image, a square image or the like). That is, for example, the right-angle quadrilateral image generation section 4e extends a shorter side of the image region in the extraction candidate region C to make the shorter side equal to a longer side thereof, or reduces a longer side thereof to make the longer side equal to a shorter side thereof, thereby generating the right-angle quadrilateral image R.

Figure 6B:
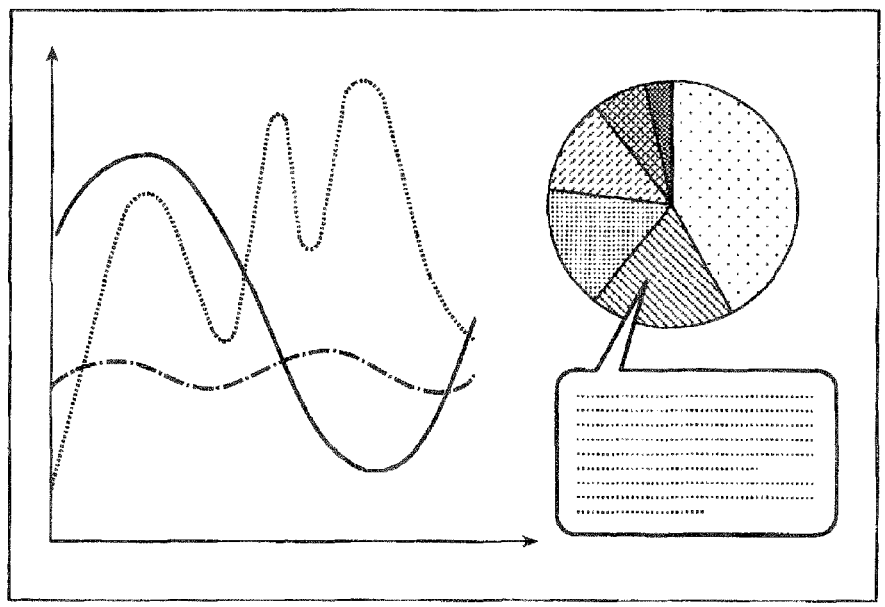

In FIG. 6B, the right-angle quadrilateral image R is schematically shown. The right-angle quadrilateral image R is generated by the right-angle quadrilateral transformation processing being performed on the image data corresponding to the extraction candidate region C (quadrilateral region) shown in FIG. 6A.

The right-angle quadrilateral image generation section 4e constitutes a generation section which performs the right-angle quadrilateral transformation processing on the image of the quadrilateral region identified as the extraction candidate region C by the candidate region identification section 4d, so as to generate the right-angle quadrilateral image R.

The display section 5 is constituted of a liquid crystal display panel, an organic EL display panel or the like. The display section 5 displays images of various pieces of information on a display screen thereof under the control of the display control section 6.

The display control section 6 reads image data for display temporarily stored in the buffer memory 9a of the memory section 9, and controls the display section 5 so that the read image data is displayed thereon.

More specifically, the display control section 6 includes a not-shown VRAM (Video Random Access Memory), a VRAM controller and a digital video encoder. The digital video encoder reads brightness signals Y and color difference signals Cb and Cr of the frame images F, the signals being read from the buffer memory 9a and stored in the VRAM, from the VRAM via the VRAM controller at a predetermined replay frame rate, generates video signals based on the read data (signals), and outputs the generated video signals to the display section 5. Thus, the display section 5 displays live view images on the display screen by consecutively updating the frame images F at the predetermined replay frame rate, while the image pickup section 1 picks up the images of a subject.

Furthermore, the display control section 6 outputs a video signal of an image for rec-view (a rec-view image) of the recording image G picked up by the image pickup section 1 to the display section 5 so that the rec-view image is displayed on the display screen of the display section 5.

The display control section 6 makes the display section 5 conspicuously display a plurality of quadrilateral regions identified by the candidate region identification section 4d in a predetermined order, in the recording image G picked up by the image pickup section 1.

That is, the display control section 6 makes the display section 5 conspicuously display, in the recording image G, the quadrilateral regions in a predetermined order on the basis of their respective distances to the corresponding region B, which corresponds to the brightness change region A. More specifically, the display control section 6 obtains the image data of the recording image G, which is picked up by the image pickup section 1 and generated by the image generation section 3, as the image data of the rec-view image on the basis of a full-press operation onto the shutter button 8a of the operation input section 8 by a user, for example. Then, the display control section 6 displays an identification frame in a predetermined color at the edge of one quadrilateral region among the quadrilateral regions on the rec-view image of the recording image G by OSD (On-Screen Display). The one quadrilateral region is a quadrilateral region located closest to the corresponding region B, which corresponds to the brightness change region A, on the basis of the position of the corresponding region B. Thereafter, when it is instructed to display the next quadrilateral region on the basis of a predetermined operation on the selection button 8b, the decision button 8c or the like of the operation input section 8 by the user, the display control section 6 displays the identification frame at the edge of the next quadrilateral region among the quadrilateral regions on the rec-view image of the recording image G by OSD. The next quadrilateral region is a quadrilateral region located next closest to the corresponding region B, which corresponds to the brightness change region A. The distances from the quadrilateral regions to the corresponding region B may be determined, for example, on the basis of their center positions or four corners' positions.

Thus, the display control section 6 conspicuously displays, in the picked-up image, the quadrilateral regions identified by the candidate region identification section 4d on the display section 5 in descending order of closeness in distance to the corresponding region B, which corresponds to the brightness change region A, namely, conspicuously displays the quadrilateral regions one by one starting from the quadrilateral region located closest to the corresponding region B.

The OSD of the identification frame to display the quadrilateral regions in the rec-view image of the picked-up image is not a limit but an example. Hence, as long as the quadrilateral regions can be conspicuous, the way to display the quadrilateral regions can be appropriately changed.

Thus, the display control section 6 constitutes a display control section which displays, in the picked-up image, the quadrilateral regions identified by the candidate region identification section 4d on the display section 5 in a predetermined order on the basis of their respective distances to the corresponding region B, which corresponds to the brightness change region A.

The recording medium control section 7 is configured in such a way that the recording medium M is freely detachable, and controls data reading from the attached recording medium M and data writing onto the recording medium M.

The recording medium M is constituted of a nonvolatile memory (flash memory) or the like. However, this is not a limit but an example, and hence can be appropriately changed.

The operation input section 8 is for performing predetermined operations of the image pickup apparatus 100. More specifically, the operation input section 8 includes the shutter button 8a, the selection button 8b and the decision button 8c. The shutter button 8a is related to image pickup commands of a subject, and can be half-pressed and full-pressed. The selection button 8b is related to selection commands, and for selecting image pickup modes, functions and the like. The decision button 8c is related to decision commands, and for deciding the image pickup modes, the functions and the like. The operation input section 8 outputs predetermined operation signals to the central control section 10 in accordance with operations on these buttons.

The memory section 9 includes the buffer memory 9a and a program memory 9b.

The buffer memory 9a is a buffer where image data and the like are temporarily stored. The buffer memory 9a is also used as a working memory for the central control section 10, for example.

In the program memory 9b, various programs and data for the functions of the image pickup apparatus 100 are stored.

The central control section 10 controls the sections and the like of the image pickup apparatus 100. More specifically, the central control section 10 includes a CPU (not shown) which controls the sections and the like of the image pickup apparatus 100, and performs various control operations in accordance with various processing programs (not shown).

Next, the image pickup processing by the image pickup apparatus 100 is described with reference to FIGS. 2 to 6B.

Figure 2:
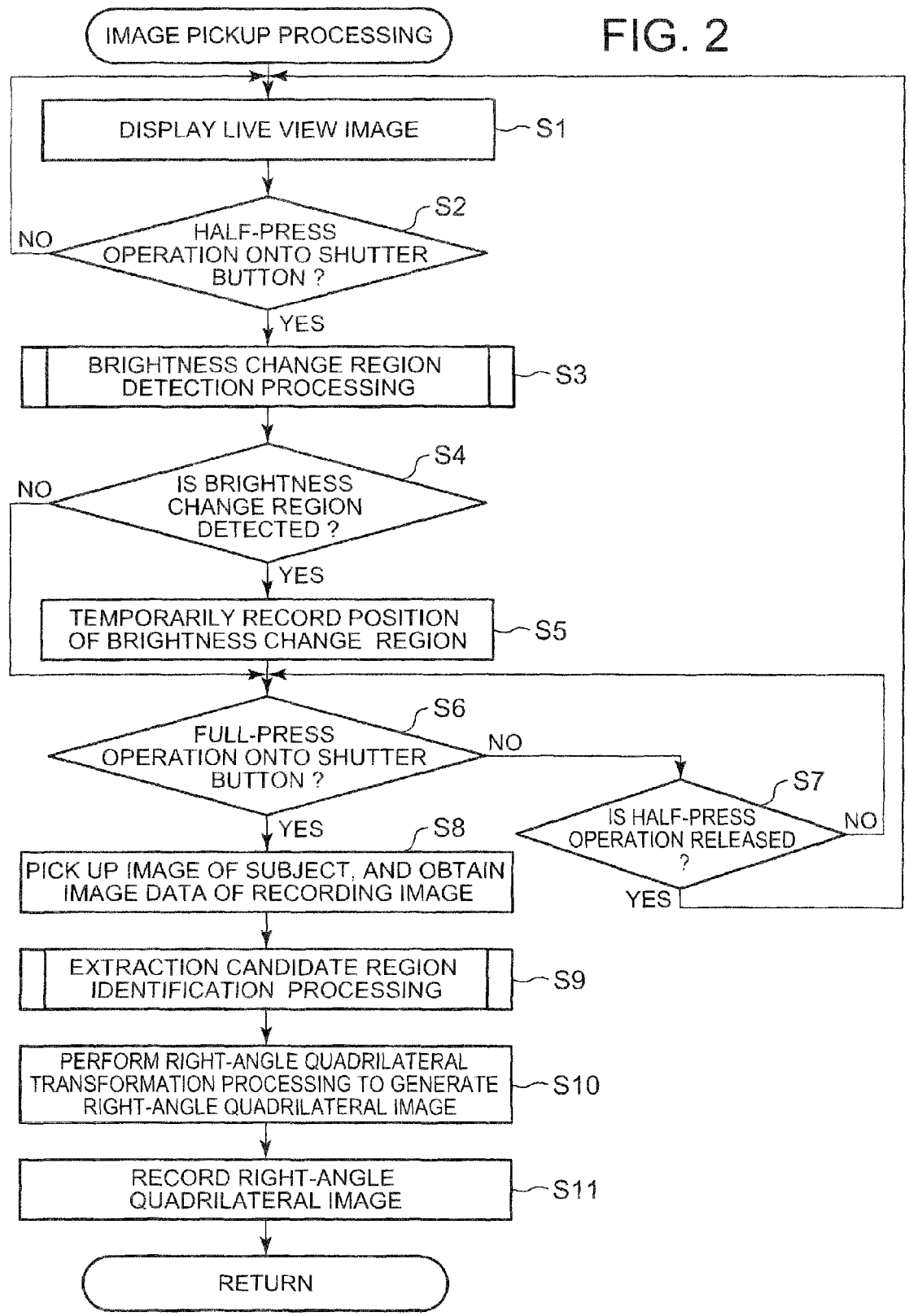
FIG. 2 is a flowchart showing examples of operations of image pickup processing performed by the image pickup apparatus shown in FIG. 1.

FIG. 2 is a flowchart showing examples of operations of the image pickup processing.

The following image pickup processing is performed, for example, when an image pickup mode is selected on the basis of a predetermined operation on the selection button 8b, the decision button 8c or the like of the operation input section 8 by a user. The image pickup mode is a mode in which a paper document, a name card, a whiteboard, the display screen 201 of the display apparatus 200, a projected image from a projector or the like is a subject.

As shown in FIG. 2, first, the display control section 6 displays live view images on the display screen of the display section 5 on the basis of a plurality of frame images F, the frame images F which are picked up by the image pickup section 1 picking up images of a subject, and the image data of which are generated by the image generation section 3 (Step S1; shown in FIG. 5A).

Then, the CPU of the central control section 10 determines whether or not an operation signal for a half-press operation on the shutter button 8a of the operation input section 8 by a user is inputted while the live view images are displayed (Step S2).

When it is determined that the operation signal for the half-press operation is not inputted (Step S2; NO), the CPU of the central control section 10 moves to Step S1, and repeatedly displays the live view images on the display screen of the display section 5.

On the other hand, when it is determined that the operation signal for the half-press operation is inputted (Step S2; YES), the CPU of the central control section 10 controls execution of the brightness change region detection processing (shown in FIG. 3) (Step S3).

The brightness change region detection processing is described with reference to FIG. 3.

Figure 3:
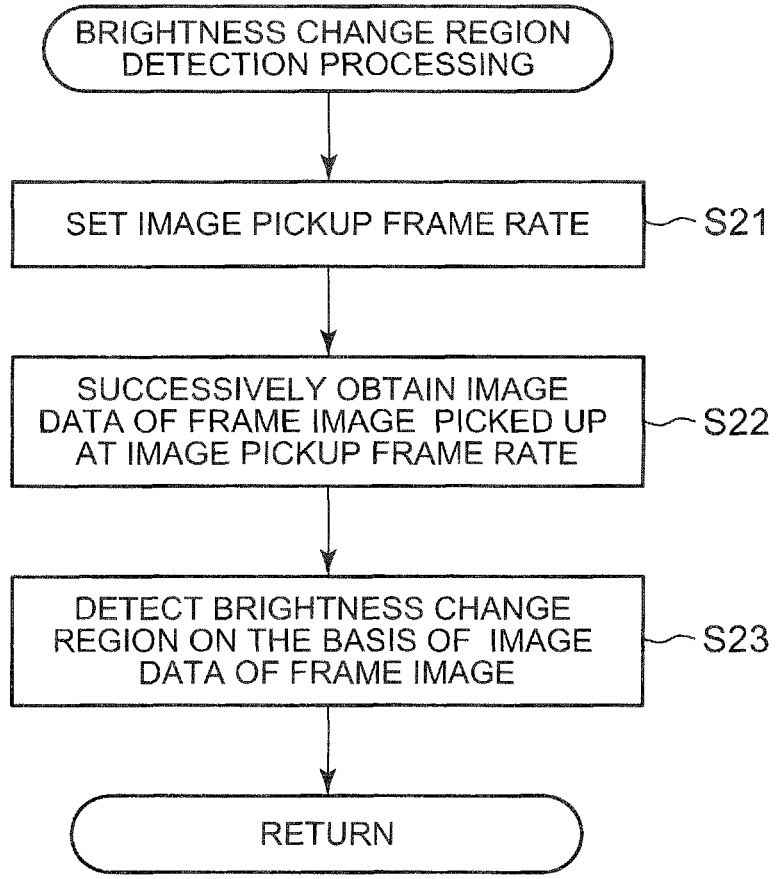
FIG. 3 is a flowchart showing examples of operations of brightness change region detection processing in the image pickup processing shown in FIG. 2.

FIG. 3 is a flowchart showing examples of operations of the brightness change region detection processing.

As shown in FIG. 3, first, the image pickup frame rate setting section 2a of the image pickup control section 2 sets the image pickup frame rate to a predetermined value (Step S21). More specifically, the image pickup frame rate setting section 2a sets the image pickup frame rate to not a value (15 fps, for example) which corresponds to the normal speed photography but a value (120 fps, for example) which corresponds to the high speed photography. With the high speed photography, the number of frame images F picked up per unit time is more than that with the normal speed photography. Consequently, the image pickup section 1 picks up images of the subject (the display screen 201 of the display apparatus 200, for example) at predetermined image pickup intervals corresponding to the set value of the image pickup frame rate.

Next, the image obtaining section 4a of the image processing section 4 successively obtains image data of the frame images F, which are picked up by the image pickup section 1 at predetermined image pickup intervals, and the image data of which are generated by the image generation section 3 (Step S22).

Then, the brightness change region detection section 4b of the image processing section 4 detects the brightness change region A, where brightness changes at predetermined time intervals, in the frame images F, which are successively obtained by the image obtaining section 4a (Step S23). More specifically, the brightness change region detection section 4b calculates, with respect to each frame image F, a difference between a brightness component (a brightness signal Y, for example) of the frame image F (a second frame image F) and a brightness component of its preceding frame image F (a first frame image F), and identifies the brightness change amount, which represents the amount of change of brightness from the first frame image F to the second frame image F, on a pixel basis. Then, the brightness change region detection section 4b identifies all pixels, in each of which brightness changes periodically, on the basis of the brightness change amounts of the pixels identified with respect to all the frame images F, so as to identify a region constituted of the pixels, in each of which brightness changes periodically, as the brightness change regions A (shown in FIG. 5B).

This is the end of the brightness change region detection processing.

When the brightness change region detection processing is ended, the image pickup frame rate setting section 2a may reset the image pickup frame rate to a value (15 fps, for example) which corresponds to the normal speed photography.

Referring back to FIG. 2, the image processing section 4 determines whether or not the brightness change region A is detected by the brightness change region detection section 4b (Step S4).

When it is determined that the brightness change region A is detected (Step S4; YES), namely, it is determined that images of a subject, the brightness of which changes at predetermined time intervals, such as the display screen 201 of the display apparatus 200, are picked up, the brightness change region detection section 4b obtains information on the position of the brightness change region A in the frame images F, and temporarily records the information in the buffer memory 9a (Step S5).

Next, the CPU of the central control section 10 determines whether or not an operation signal for a full-press operation onto the shutter button 8a of the operation input section 8 by the user is inputted (Step S6).

Furthermore, when it is determined that the brightness change region A is not detected (Step S4; NO), the CPU of the central control section 10 skips Step S5, and determines whether or not the operation signal for the full-press operation is inputted (Step S6).

When it is determined that the operation signal for the full-press operation is not inputted (Step S6; NO), the CPU of the central control section 10 determines whether or not the half-press operation onto the shutter button 8a of the operation input section 8 by the user is released (Step S7).

When it is determined that the half-press operation is not released (Step S7; NO), the CPU of the central control section 10 moves to Step S6, so as to determine whether or not the operation signal for the full-press operation is inputted.

On the other hand, when it is determined that the half-press operation is released (Step S7; YES), the CPU of the central control section 10 moves to Step S1, so as to display the live view images on the display screen of the display section 5.

When it is determined that the operation signal for the full-press operation is inputted (Step S6; YES), the image pickup section 1 picks up an image in such a way as to have a similar composition as the compositions of the frame images F, which are used to detect the brightness change region A, under a predetermined image pickup condition adjusted by the image pickup control section 2, and the image obtaining section 4a obtains image data (YUV data) of the image (the recording image G) generated by the image generation section 3 (Step S8).

Next, the CPU of the central control section 10 controls execution of the extraction candidate region identification processing (shown in FIG. 4) (Step S9).

The extraction candidate region identification processing is described with reference to FIG. 4.

Figure 4:
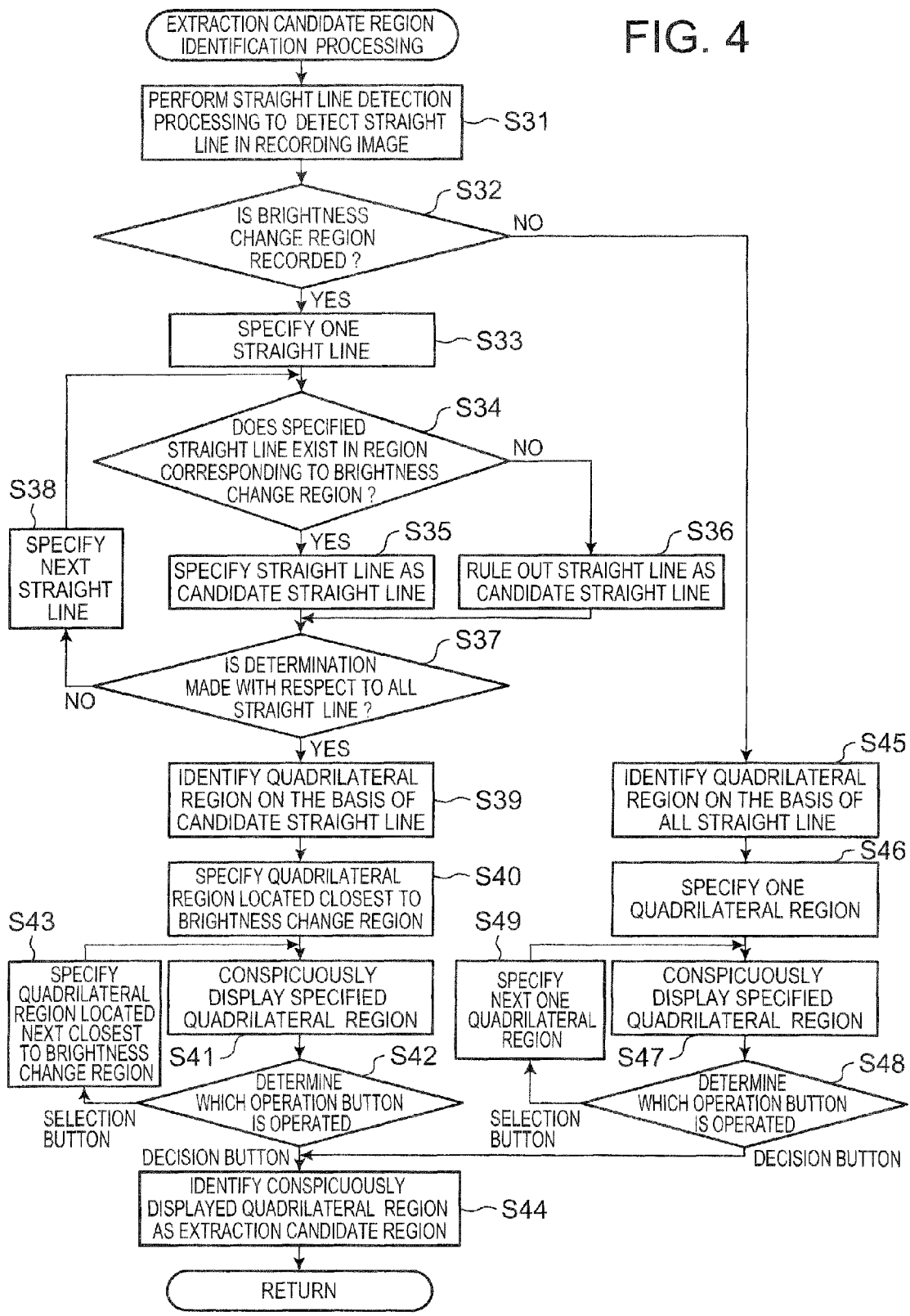
FIG. 4 is a flowchart showing examples of operations of extraction candidate region identification processing in the image pickup processing shown in FIG. 2.

FIG. 4 is a flowchart showing examples of operations of the extraction candidate region identification processing.

As shown in FIG. 4, first, the straight line identification section 4c of the image processing section 4 performs the straight line detection processing on the image data of the recording image G obtained by the image obtaining section 4a, so as to detect all the straight lines L in the recording image G (Step S31). More specifically, the straight line identification section 4c obtains brightness components (brightness signals Y, for example) included in the recording image G, and performs the straight line detection processing (the Hough transform, for example) on the brightness components, so as to detect all the straight lines L in the recording image G.

Next, the straight line identification section 4c determines whether or not the information on the position of the brightness change region A is recorded in the buffer memory 9a (Step S32).

When it is determined that the information on the position of the brightness change region A is recorded (Step S32; YES), namely, when it is determined that images of a subject, the brightness of which changes at predetermined time intervals, such as the display screen 201 of the display apparatus 200, are picked up, the straight line identification section 4c obtains the information on the position of the brightness change region A from the buffer memory 9a, identifies the position of the corresponding region B, which corresponds to the brightness change region A, in the recording image G, and then specifies one straight line L from among all the detected straight lines L in accordance with a predetermined specification condition (Step S33).

Next, the excluding section c1 of the straight line identification section 4c determines whether or not the specified straight line L exists in the corresponding region B, which corresponds to the brightness change region A, in the recording image G (Step S34).

When it is determined that the specified straight line L exists in the corresponding region B (Step S34; YES), the straight line identification section 4c specifies the straight line L as the candidate straight line L1 for identifying a quadrilateral region (Step S35). On the other hand, when it is determined that the specified straight line L (straight line L2, for example) does not exist in the corresponding region B (Step S34; NO), the excluding section c1 of the straight line identification section 4c rules out the straight line L as the candidate straight line L1 for identifying a quadrilateral region (Step S36).

Then, the straight line identification section 4c determines whether or not the determination at Step S34 is made with respect to all the straight lines L detected in the recording image G (Step S37).

When it is determined that the determination is not made with respect to all the straight lines L (Step S37; NO), the straight line identification section 4c specifies the next straight line L, which is to be processed, in accordance with the predetermined specification condition (Step S38), and moves to Step S34.

By repeating the above-described Steps S34 to S38 until it is determined that the determination is made with respect to all the straight lines L (Step S37; YES), the straight line identification section 4c identifies the candidate straight lines L1 (shown in FIG. 6A) included in the corresponding region B, which corresponds to the brightness change region A, in the recording image G.

Next, the candidate region identification section 4d of the image processing section 4 identifies, on the basis of the candidate straight lines L1 identified by the straight line identification section 4c, quadrilateral regions, each of which is constituted of the candidate straight lines L1, in the recording image G (Step S39). More specifically, the candidate region identification section 4d identifies quadrilateral regions, each of which is formed by four candidate straight lines L1 extending in predetermined directions among all the candidate straight lines L1 identified by the straight line identification section 4c.

Then, the candidate region identification section 4d specifies a quadrilateral region located closest to the corresponding region B, which corresponds to the brightness change region A, from among the identified quadrilateral regions (Step S40). Then, the display control section 6 conspicuously displays the quadrilateral region, which is specified by the candidate region identification section 4d, in the recording image G on the display section 5 (Step S41). More specifically, the display control section 6 displays the identification frame at the edge of the quadrilateral region on the rec-view image of the recording image G by OSD.

Next, the candidate region identification section 4d determines which operation button of the operation input section 8 is operated by the user (Step S42).

More specifically, when a predetermined operation is performed on the selection button 8b of the operation input section 8 by the user (Step S42; selection button), the candidate region identification section 4d specifies a quadrilateral region located next closest to the corresponding region B after the conspicuously displayed quadrilateral region, from among the identified quadrilateral regions (Step S43), and moves to Step S41. Then, the display control section 6 conspicuously displays the quadrilateral region, which is newly specified by the candidate region identification section 4d, in the recording image G on the display section 5 (Step S41).

On the other hand, when a predetermined operation is performed on the decision button 8c of the operation input section 8 by the user (Step S42; decision button), the candidate region identification section 4d identifies the quadrilateral region conspicuously displayed on the display section 5 as the extraction candidate region C (Step S44, shown in FIG. 6A), and ends the extraction candidate region identification processing.

On the other hand, when it is determined that the information on the position of the brightness change region A is not recorded (Step S32; NO), namely, it is determined that images of a subject, the brightness of which does not change at predetermined time intervals, such as a paper document, a name card or a whiteboard, are picked up, the candidate region identification section 4d identifies, on the basis of all the straight lines L detected by the straight line identification section 4c, quadrilateral regions, each of which is constituted of the straight lines L, in the recording image G (Step S45). More specifically, the candidate region identification section 4d identifies quadrilateral regions, each of which is formed by four straight lines L extending in predetermined directions among all the straight lines L detected by the straight line identification section 4c.

Next, the candidate region identification section 4d specifies one quadrilateral region from among the identified quadrilateral regions in accordance with a predetermined specification condition (Step S46). Then, the display control section 6 conspicuously displays the quadrilateral region, which is specified by the candidate region identification section 4d, in the recording image G on the display section 5 (Step S47).

Next, the candidate region identification section 4d determines which operation button of the operation input section 8 is operated by the user (Step S48).

More specifically, when a predetermined operation is performed on the selection button 8b of the operation input section 8 by the user (Step S48; selection button), the candidate region identification section 4d specifies the next quadrilateral region, which is to be processed, in accordance with the predetermined specification condition from among the identified quadrilateral regions (Step S49), and moves to Step S47. Then, the display control section 6 conspicuously displays the quadrilateral region, which is newly specified by the candidate region identification section 4d, in the recording image G on the display section 5 (Step S47).

On the other hand, when a predetermined operation is performed on the decision button 8c of the operation input section 8 by the user (Step S48; decision button), the candidate region identification section 4d moves to Step S44, so as to identify the quadrilateral region conspicuously displayed on the display section 5 as the extraction candidate region C, and ends the extraction candidate region identification processing.

Referring back to FIG. 2, the right-angle quadrilateral image generation section 4e of the image processing section 4 performs the right-angle quadrilateral transformation processing on an image of the extraction candidate region C (quadrilateral region) identified by the extraction candidate region identification processing, so as to generate the right-angle quadrilateral image R (Step S10; shown in FIG. 6B). More specifically, the right-angle quadrilateral image generation section 4e extracts an image region in the extraction candidate region C from the recording image G, and then performs the right-angle quadrilateral transformation processing on the image data of the image region, so as to generate the right-angle quadrilateral image R.

Then, the image processing section 4 transfers the image data of the generated right-angle quadrilateral image R to the recording medium control section 7, and the recording medium control section 7 correlates the image data of the right-angle quadrilateral image R with the image data of the recording image G, and records the correlated image data onto the recording medium M (Step S11).

This is the end of the image pickup processing.

As described above, the image pickup apparatus 100 in the embodiment performs the straight line detection processing on the image data of the recording image G to detect the straight lines L, identifies the candidate straight lines L1 included in the corresponding region B, which corresponds to the brightness change region A where brightness changes at predetermined time intervals, and identifies the quadrilateral region constituted of the candidate straight lines L1 in the recording image G as the extraction candidate region C. Accordingly, for example, in a case where images outputted from an output apparatus at predetermined rewriting intervals (for example, images in the display screen 201 of the display apparatus 200) is a main subject, the quadrilateral region identified as the extraction candidate region C in the recording image G can be limited to the quadrilateral region constituted of the candidate straight lines L1 included in the corresponding region B, which corresponds to the brightness change region A. That is, in the recording image G, a quadrilateral region constituted of the straight lines L (straight lines L2) existing outside the corresponding region B, which corresponds to the brightness change region A, and having low possibility to be extracted from the recording image G at the end, can be ruled out as the extraction candidate region C, and a quadrilateral region constituted of the candidate straight lines L1 included in the corresponding region B, which corresponds to the brightness change region A, and having high possibility to be extracted from the recording image G can be identified as the extraction candidate region C.

Thus, the image pickup apparatus 100 in the embodiment facilitates identification of a quadrilateral region in the recording image G, and can efficiently extract an image of the quadrilateral region from the recording image G.

In the embodiment, from among all the straight lines L included in the recording image G, the straight lines L which are detected by performing the straight line detection processing on the whole image region of the recording image G, the straight lines L2 detected outside the corresponding region B, which corresponds to the brightness change region A, are excluded. Accordingly, the candidate straight lines L1 included in the corresponding region B, which corresponds to the brightness change region A, can be efficiently identified. Consequently, the quadrilateral region constituted of the candidate straight lines L1 can be efficiently identified as the extraction candidate region C in the recording image G.

In the embodiment, in the recording image G, a plurality of quadrilateral regions identified by the candidate region identification section 4d is conspicuously displayed on the display section 5 in a predetermined order on the basis of their respective distances to the corresponding region B, which corresponds to the brightness change region A. Accordingly, among the quadrilateral regions, a quadrilateral region desired by a user can be identified as the extraction candidate region C. In particular, for example, by conspicuously displaying the quadrilateral regions in a descending order of closeness in distance to the corresponding region B, which corresponds to the brightness change region A, a user can easily select and specify a quadrilateral region located relatively close to the corresponding region B as the extraction candidate region C. Accordingly, an image of a quadrilateral region can be efficiently extracted from the recording image G.

In the embodiment, the right-angle quadrilateral transformation processing is performed on the image of the quadrilateral region identified as the extraction candidate region C so that the right-angle quadrilateral image R is generated. Accordingly, the right-angle quadrilateral image R to which distortion of the quadrilateral image is corrected can be obtained.

The present invention is not limited to the above-described embodiment, and hence various modifications and design changes may be made without departing from the scope of the present invention.

For example, in the embodiment, as a method for identifying the straight lines L (candidate straight lines L1) included in the corresponding region B, which corresponds to the brightness change region A, in the recording image G, the straight line identification section 4c identifies all the straight lines L included in the recording image G, and then excludes the straight lines L2 detected outside the corresponding region B, which corresponds to the brightness change region A. However, this is not a limit but an example, and hence can be appropriately changed. That is, it is possible that the straight line identification section 4c does not have the excluding section c1, performs the straight line detection processing on the corresponding region B, which corresponds to the brightness change region A, in the recording image G, and identifies a plurality of straight lines L (candidate straight lines L1) included in the corresponding region B.

Accordingly, the candidate straight lines L1 included in the corresponding region B, which corresponds to the brightness change region A, can be efficiently identified. Consequently, a quadrilateral region constituted of the candidate straight lines L1 can be efficiently identified in the recording image G as the extraction candidate region C.

In the embodiment, the candidate region identification section 4d identifies a quadrilateral region specified on the basis of a predetermined operation on the selection button 8b, the decision button 8c or the like of the operation input section 8 by a user as the extraction candidate region C. However, this method for identifying the extraction candidate region C (quadrilateral region) is not a limit but an example, and hence can be appropriately changed.

That is, the candidate region identification section 4d may automatically identify a quadrilateral region as the extraction candidate region C on the basis of a predetermined condition. For example, the candidate region identification section 4d may identify a plurality of quadrilateral regions, each of which includes the straight lines L (candidate straight lines L1) identified by the straight line identification section 4c, and from among the plurality of quadrilateral regions, automatically identify one quadrilateral region located closest to the corresponding region B, which corresponds to the brightness change region A, on the basis of the position of the corresponding region B.

Consequently, one quadrilateral region can be automatically identified as the extraction candidate region C on the basis of the position of the corresponding region B, which corresponds to the brightness change region A, in the recording image G. Accordingly, a predetermined operation on the operation input section 8 by a user becomes unnecessary to identify the extraction candidate region C, and hence the extraction candidate region C can be identified easily and simply.

In the embodiment, the image pickup processing (shown in FIG. 2) is performed with a paper document, a name card, a whiteboard, the display screen 201 of the display apparatus 200, a projected image from a projector or the like as a subject. However, the image pickup processing may be performed dedicatedly to a subject, the brightness of which changes at predetermined time intervals, such as the display screen 201 of the display apparatus 200 or a projected image from a projector.

That is, by providing an image pickup mode dedicated to a subject, the brightness of which changes at predetermined time intervals, when the image pickup mode is selected by a predetermined operation on the operation input section 8 by a user, the image pickup apparatus 100 does not need to take Step S4 to determine whether or not the brightness change region A is detected by the brightness change region detection section 4b (Step S4) in the image pickup processing (shown in FIG. 2), Step S32 to determine whether or not the information on the position of the brightness change region A is recorded (Step S32) in the extraction candidate region identification processing (shown in FIG. 4), and Steps S45 to S49 which are taken when determining that the information on the position of the brightness change region A is not recorded (Step S32; NO).

In the embodiment, the right-angle quadrilateral transformation processing is performed on the image of the quadrilateral region identified as the extraction candidate region C so that the right-angle quadrilateral image R is generated. However, it is not always necessary to generate the right-angle quadrilateral image R. That is, the image pickup apparatus 100 does not always need to have the right-angle quadrilateral image generation section 4e which generates the right-angle quadrilateral image R, and hence may have any configuration as long as a quadrilateral region constituted of the candidate straight lines L1 identified by the straight line identification section 4c can be identified as the extraction candidate region C in the recording image G.

In the embodiment, in the image pickup processing (shown in FIG. 2), the brightness change region A in the frame images F is identified, and then the recording image G is picked up. However, the order of the operations of the processing is not limited thereto, and hence can be appropriately changed. That is, it is possible that the recording image G is picked up, and then the frame images F having similar compositions to the composition of the recording image G are picked up, and the brightness change region A in the frame images F is identified.

In the embodiment, the brightness change region A is detected from the frame images F, and a quadrilateral region (the extraction candidate region C) is identified in the recording image G. That is, in the embodiment, the picked-up images used to detect the brightness change region A are different from the picked-up image used to identify the quadrilateral region (the extraction candidate region C). However, detection of the brightness change region A and identification of the quadrilateral region (the extraction candidate region C) may be performed using a same picked-up image (or same picked-up images).

That is, for example, on the basis of the image data of the recording image G obtained by the image obtaining section 4a, detection of the brightness change region A and identification of the quadrilateral region (the extraction candidate region C) may be performed. Alternatively, for example, on the basis of the image data of at least one frame image F obtained by the image obtaining section 4a, detection of the brightness change region A and identification of the quadrilateral region (the extraction candidate region C) may be performed.

The configuration of the image pickup apparatus 100 as an image processing apparatus is not limited to the configuration described in the embodiment. As long as the image pickup apparatus 100 has at least the obtaining section, the detection section, the first identification section, and the second identification section, the configuration of the image pickup apparatus 100 can be appropriately changed.

In the embodiment, functions of the obtaining section, the detection section, the first identification section, and the second identification section are realized by the image obtaining section 4a, the brightness change region detection section 4b, the straight line identification section 4c, and the candidate region identification section 4d being driven under the control of the central control section 10, respectively. However, this is not a limit. Hence, the functions of these sections may be realized by the CPU of the central control section 10 executing a predetermined program or the like.

That is, in the program memory 9b where programs are stored, a program including an obtaining processing routine, a detection processing routine, a first identification processing routine, and a second identification processing routine is stored. Then, the obtaining processing routine may make the CPU of the central control section 10 function as the obtaining section which obtains image data of a first picked-up image and a second picked-up image picked up by the image pickup section. In addition, the detection processing routine may make the CPU of the central control section 10 function as the detection section which detects the brightness change region A where brightness changes at predetermined time intervals in the first picked-up image on the basis of the image data of the first picked-up image obtained by the obtaining section. In addition, the first identification processing routine may make the CPU of the central control section 10 function as the first identification section which performs the straight line detection processing on the image data of the second picked-up image obtained by the obtaining section to detect a straight line L, so as to identify a candidate straight line L1 in the corresponding region B, which corresponds to the brightness change region A. In addition, the second identification processing routine may make the CPU of the central control section 10 function as the second identification section which identifies a quadrilateral region including the candidate straight line L1 identified by the first identification section as the extraction candidate region C in the second picked-up image.

Similarly, the excluding section, the display control section, and the generation section may be realized by the CPU of the central control section 10 executing a predetermined program or the like.

As a computer readable medium storing the programs to perform the processing described above, other than a ROM, a hard disc or the like, a nonvolatile memory such as a flash memory or a portable recording medium such as a CD-ROM can be used. Furthermore, a carrier wave can be used as a medium which provides data of the programs via a predetermined communication line.

This application is based upon and claims the benefit of priority under 35 USC 119 of Japanese Patent Application No. 2011-170616 filed on Aug. 4, 2011, the entire disclosure of which, including the description, claims, drawings, and abstract, is incorporated herein by reference in its entirety.

What is claimed is:

1. An image processing apparatus comprising:
    an obtaining section which obtains image data of a first picked-up image and a second picked-up image picked up by an image pickup section;
    a detection section which detects a brightness change region where brightness changes at predetermined time intervals in the first picked-up image based on the obtained image data of the first picked-up image;
    a first identification section which performs straight line detection processing on the obtained image data of the second picked-up image to detect a straight line, so as to identify a candidate straight line not including a non-candidate straight line detected outside a corresponding region corresponding to the brightness change region; and
    a second identification section which identifies a quadrilateral region including the candidate straight line as an extraction candidate region in the second picked-up image.

2. The image processing apparatus according to claim 1, wherein:
    the obtaining section successively obtains image data of a plurality of first picked-up images, the first picked-up images being picked up at predetermined image pickup intervals by the image pickup section and including images outputted at predetermined rewriting intervals from an output apparatus; and
    the detection section detects the brightness change region in the first picked-up images based on the obtained image data of the first picked-up images.

3. The image processing apparatus according to claim 1, wherein:
    the first identification section includes an excluding section which excludes the non-candidate straight line detected outside the corresponding region from among a plurality of straights lines detected in the second picked-up image, the straights lines being detected by the straight line detection processing performed on a whole image region of the second picked-up image; and
    the second identification section identifies the quadrilateral region including the candidate straight line and not including the non-candidate straight line excluded by the excluding section as the extraction candidate region.

4. The image processing apparatus according to claim 1, wherein the first identification section performs the straight line detection processing on the corresponding region, so as to identify the candidate straight line in the corresponding region.

5. The image processing apparatus according to claim 1, wherein:
    the second identification section identifies a plurality of quadrilateral regions, each of which includes the candidate straight line;
    the image processing apparatus further comprises a display control section which conspicuously displays the identified quadrilateral regions in the second picked-up image on a display section in a predetermined order based on distances from the quadrilateral regions to the corresponding region; and
    the second identification section identifies the extraction candidate region from among the quadrilateral regions conspicuously displayed on the display section.

6. The image processing apparatus according to claim 5, wherein the display control section conspicuously displays the identified quadrilateral regions in the second picked-up image on the display section in a descending order of closeness in distance to the corresponding region.

7. The image processing apparatus according to claim 1, wherein the second identification section identifies a plurality of quadrilateral regions, each of which includes the candidate straight line, and the second identification section identifies, from among the identified quadrilateral regions, a quadrilateral region located closest to the corresponding region as the extraction candidate region.

8. The image processing apparatus according to claim 1 further comprising a generation section which performs right-angle quadrilateral transformation processing on an image of the quadrilateral region identified by the second identification section as the extraction candidate region, so as to generate a right-angle quadrilateral image.

9. An image processing method comprising:
    obtaining image data of a first picked-up image and a second picked-up image picked up by an image pickup section;
    detecting a brightness change region where brightness changes at predetermined time intervals in the first picked-up image based on the obtained image data of the first picked-up image;
    performing straight line detection processing on the obtained image data of the second picked-up image to detect a straight line, so as to identify a candidate straight line not including a non-candidate straight line detected outside a corresponding region corresponding to the brightness change region; and identifying a quadrilateral region including the candidate straight line as an extraction candidate region in the second picked-up image.

10. A non-transitory computer-readable recording medium having a program recorded thereon which is executable to control a computer of an image processing apparatus to function as:

an obtaining section which obtains image data of a first picked-up image and a second picked-up image picked up by an image pickup section;

a detection section which detects a brightness change region where brightness changes at predetermined time intervals in the first picked-up image based on the obtained image data of the first picked-up image;

a first identification section which performs straight line detection processing on the obtained image data of the second picked-up image to detect a straight line, so as to identify a candidate straight line not including a non-candidate straight line detected outside a corresponding region corresponding to the brightness change region; and a second identification section which identifies a quadrilateral region including the candidate straight line as an extraction candidate region in the second picked-up image.

* * * * *